United States Patent [19]
Feygin et al.

[11] Patent Number: 5,846,270

[45] Date of Patent: Dec. 8, 1998

[54] MAGNETIC-ABRASIVE POWDER AND METHOD OF PRODUCING THE SAME

[76] Inventors: Savva Feygin, 37 Livingston La., Manalapan, N.J. 07726; Gennady Kremen, 150 95th St. Apt 5c, Brooklyn, N.Y. 11209; Leonid Igelstyn, 44 Livingston La., Manalapan, N.J. 07726

[21] Appl. No.: 55,449

[22] Filed: Apr. 6, 1998

[51] Int. Cl.$^6$ ...................................................... C09C 1/68

[52] U.S. Cl. ........................... 51/307; 51/309; 252/62.51; 252/62.54; 252/62.56; 75/230; 75/232; 75/236; 75/255; 75/252

[58] Field of Search ............................... 51/309, 307, 293; 252/62.51, 62.54, 62.56; 75/230, 232, 236, 255, 252

[56] References Cited

U.S. PATENT DOCUMENTS

| | | | |
|---|---|---|---|
| 4,286,022 | 8/1981 | Vermillion et al. | 428/423.1 |
| 4,379,800 | 4/1983 | Sato | 428/148 |
| 4,685,937 | 8/1987 | Hori et al. | 51/309 |
| 4,761,243 | 8/1988 | Kakuishi et al. | 252/62.54 |
| 5,110,659 | 5/1992 | Yamakawa et al. | 428/141 |

*Primary Examiner*—Deborah Jones
*Attorney, Agent, or Firm*—Ilya Zborovsky

[57] ABSTRACT

A magnetic-abrasive powder includes a magnetic component of a powder of a magnetic material, an abrasive component of a powder of an abrasive material, and an adhesive which adhesively connects particles of the magnetic material with particles of the abrasive material.

10 Claims, No Drawings

MAGNETIC-ABRASIVE POWDER AND METHOD OF PRODUCING THE SAME

BACKGROUND OF THE INVENTION

The present invention relates to a magnetic-abrasive powder and to a method of producing such a powder.

A magnetic-abrasive powder is utilized for magnetic-abrasive machining of parts. In the magnetic-abrasive machining the magnetic-abrasive powder is introduced into a magnetic field and applied to a surface of the powder to be machined by a magnetic force solely or with additional forces. Some magnetic-abrasive powders are disclosed for example in Bulgarian patent no. 04,451,269; Soviet Inventor's Certificates No. 814700, 799914, 755538, 737203, 929423, 835643, 831599, Japanese patent 2,249,967, and publications Anzai, et al "Fabrication of Ma Using Plasma Powder Melting Method. Effect of fe", "Journal of Japan Society of Powder and Powdermetallurgy, Volume 38, Issue 4, pages 472–476, June 1999; and Anzai, et al "Magnetic-abrasive Finishing of Wc-co Curved Surfaces", International Conference on Machining Jul. 22–24, 1993, National Institute of Standard Science Technology.

The known methods of manufacturing of the magnetic-abrasive powder include sintering or melting of mixtures of Fe with abrasive materials. These methods are substantially complicated. They require high temperature and vacuum furnaces and presses. As a result the existing methods are expensive, they can be implemented only with complicated equipment, and they require skilled personnel.

SUMMARY OF THE INVENTION

Accordingly, it is an object of the present invention to provide a magnetic-abrasive powder as well as a method of producing the same, which avoid the disadvantages of the prior art.

In keeping with these objects and with others which will become apparent hereinafter, one feature of present invention resides, briefly stated, in a magnetic-abrasive powder which has a magnetic component, such as for example iron powder, an abrasive component, such as for example diamond, carbide, nitride, boride, oxide powder, and a glue which connects or binds the two first mentioned components with one another. Thus, the inventive magnetic-abrasive powder is composed of particles of the magnetic and abrasive component which are glued with one another.

The method in accordance with the present invention includes preparation of a magnetic component, such as iron powder and the like, preparation of the abrasive component such as diamond, carbide, nitride, boride or oxide powder, and gluing of particles of these components with one another.

In the actual manufacturing procedure, the magnetic component and the abrasive component are mixed with one another. The glue impregnates the mixture, moisturizes the components, and surrounds the particles of the powder with a thin layer. The thusly produced mixture is hardened, and then comminuted for example by crushing so as to provide a magnetic-abrasive powder fracture of a desired size.

When the magnetic-abrasive powder is formed and the method is performed in accordance with the present invention, it is no longer necessary to use high temperature and vacuum furnaces and presses. The equipment is extremely simple, the method is very inexpensive, and the cost of the thusly obtained magnetic-abrasive powder is low. At the same time, the quality of the magnetic-abrasive powder is very high.

The novel features which are considered as characteristic for the present invention are set forth in particular in the appended claims. The invention itself, however, both as to its construction and its method of operation, together with additional objects and advantages.

DESCRIPTION OF PREFERRED EMBODIMENTS

A magnetic-abrasive powder in accordance with the present invention includes a magnetic component. The magnetic component can be for example a powder of a magnetic material, for example iron. Conventionally iron is inexpensive and has high magnetic properties. The inventive magnetic-abrasive powder further includes an abrasive component. The abrasive component can be the powder of a desired abrasive, such as for example diamond, carbide, nitride, boride, oxide powder, etc.

In the inventive magnetic-abrasive powder, the magnetic component and the abrasive component are intermixed and connected or bound with one another. For connecting or binding of these components, or more particularly of the particles of the magnetic powder and the abrasive powder, an adhesive component is utilized. The adhesive component for the magnetic-abrasive powder can include for example a cyanacrylate glue, for example cyanacrylate monomer in a liquid phase of the series 100, 200, 400, 800 etc., which is known commercially as an industrial crazy glue.

In accordance with one preferable example of the inventive magnetic-abrasive powder, it includes in percentages by weight the following components:

the magnetic component-60–90, the abrasive component-10–40;

adhesive 3–15 over 100.

The magnetic-abrasive powder in accordance with the present invention is produced in the following manner. First of all, the magnetic powder and the abrasive powder are prepared. Then they are mixed by known mixing methods to provide a uniform distribution of the components in the mixture. The thusly produced mixture is impregnated with the adhesive. Since the adhesive has high adhesive property and moisturizing property, it impregnates the whole mixture and surrounds the particles of the powder mixture with a thin layer of film. The impregnation and surrounding process takes less than 1 minute. The thusly produced mixture is hardened at room temperature. Full hardening can be achieved in about 4 hours.

The thusly produced hardened mixture has a high aggregate strength. After its glueing and hardening, the material is treated with known methods for its comminution during 0.5–1 hour, for example in a plate crusher, mill, and the like, depending on the desired size. The thusly produced magnetic-abrasive powder is then sorted over standard sieves to produce fractions of different sizes. The waste of the magnetic abrasive power is minimal and it does not exceed 1–2% of the quantity of the initial material.

The method is highly economical, it does not require high temperature and vacuum furnaces and presses, the material removal rate with the magnetic-abrasive powder in accordance with the present invention is higher than with conventional magnetic-abrasive powders obtained by conventional methods of pressing or rolling with subsequent sintering in vacuum or heating furnaces with a protective atmosphere as well as by melting of iron with abrasive. Also, the waste is substantially lower, since in the conventional methods the waste after milling constitutes approximately 8–12% of the initial quantity.

It will be understood that each of the elements described above, or two or more together, may also find a useful application in other types of construction materials and methods.

While the invention has been illustrated and described as embodied in magnetic-abrasive powder and method of producing the same it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A magnetic-abrasive powder consisting essentially of a magnetic powder component, an abrasive powder component, and an adhesive component which adhesively binds particles of the magnetic powder component with particles of the abrasive powder component.

2. A magnetic-abrasive powder as defined in claim 1, wherein the components of the powder are contained in the following weight percent:

the magnetic component 60–90% the abrasive component 10–40% the adhesive component 3–5% per 100% of the total magnetic and abrasive components.

3. A magnetic-abrasive powder as defined in claim 1, wherein the magnetic powder component is iron.

4. A magnetic-abrasive powder as defined in claim 1, wherein the abrasive powder component is selected from the group consisting of diamond, carbide, nitride, boride and oxide.

5. A magnetic-abrasive powder as defined in claim 1, wherein the adhesive component is a cyanacrylate glue.

6. A method of producing a magnetic-abrasive powder comprising the steps of:

mixing magnetic powder and abrasive powder components to form a uniform distribution of components in a mixture;

impregnating the mixture with an adhesive component;

allowing the impregnated mixture to harden at room temperature; and comminuting the hardened mixture.

7. A method as defined in claim 6, wherein the components of the powder are contained in the following weight percent:

the magnetic component 60–90% the abrasive component 10–40% the adhesive component 3–5% per 100% of the total magnetic and abrasive components.

8. A method as defined in claim 6, wherein the magnetic powder component is iron.

9. A method as defined in claim 6, wherein the abrasive powder component is selected from the group consisting of diamond, carbide, nitride, boride and oxide.

10. A method as defined in claim 6, wherein the adhesive component is a cyanacrylate glue.

* * * * *